United States Patent Office 3,417,860
Patented Dec. 24, 1968

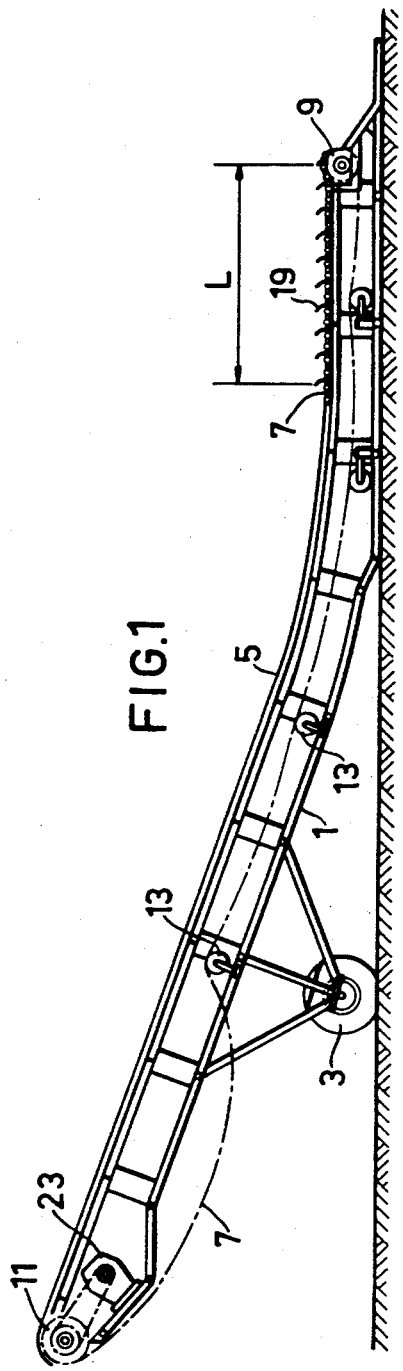
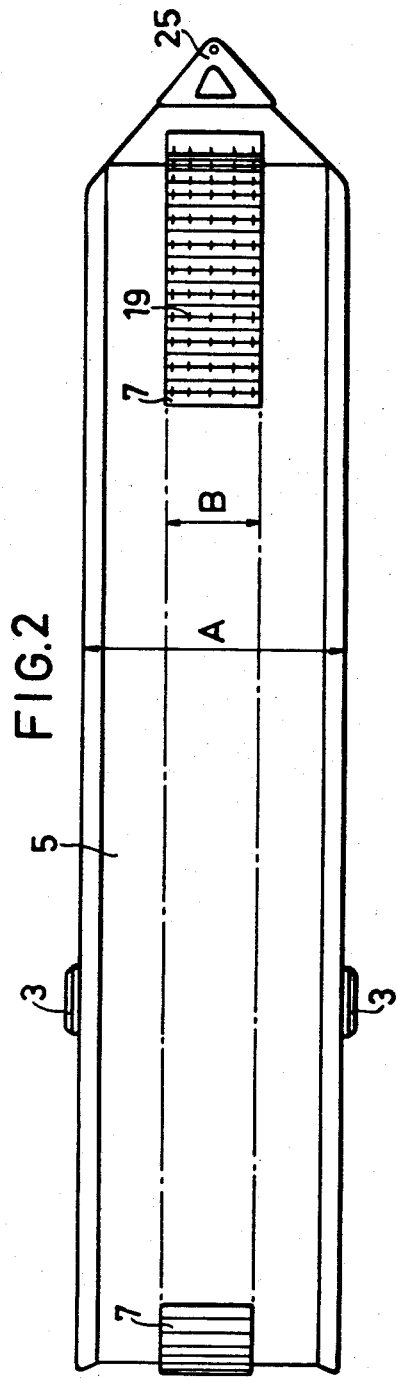

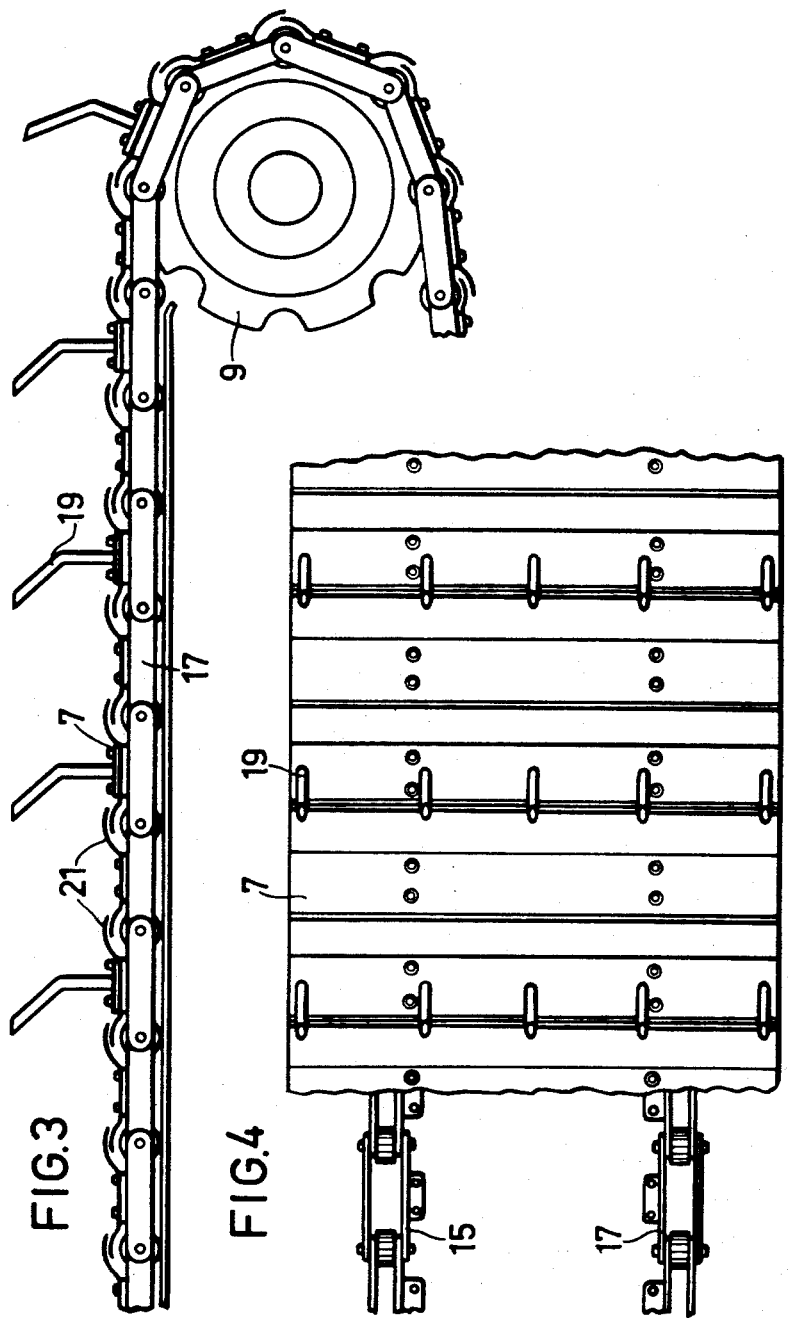

3,417,860
BRANCH CONVEYOR
Kjell Olof Gunnar Herolf, Stig Arthur Johnsson, and Per-Gustaf Mellgren, Sundsbruk, Sweden, assignors, by mesne assignments, to Soderhamns Verkstader Aktiebolag, Soderhamn, Sweden, a corporation of Sweden
Continuation of application Ser. No. 530,858, Mar. 1, 1966. This application Sept. 14, 1967, Ser. No. 667,866
Claims priority, application Sweden, Mar. 2, 1965, 2,718/65
1 Claim. (Cl. 198—197)

ABSTRACT OF THE DISCLOSURE

A branch conveyor comprising a supporting frame having a slide for branches and at least one conveyor belt moving relatively to the slide. The belt is intermittently driven and is equipped with a plurality of projecting means for holding branches during transport. The ratio of breadth of the conveyor belt to the slide is preferably on the order of between 1:2 to 1:3. The conveyor transports piles of branches from a loading area adjacent ground level to a remote, elevated discharge area.

---

This is a continuation of application Ser. No. 530,858, filed Mar. 1, 1966, now abandoned.

The trimming-off of branches by delimbing machines stationed for long periods of time at places to which the trees are hauled gives rise to the problem of limb removal from the immediate area of the machines, for these limbs can accumulate very rapidly, hindering the work.

The purpose of this invention is to provide a suitable conveyor for lopping stations, with regard to the special problems stemming from the handling of such irregular objects as branches of differing sizes and shapes.

A branch conveyor, according to this invention, is characterized by a supporting structure fitted with a slide for the branches. The slide, in turn, works in conjunction with a conveyor belt equipped with hooking or engaging devices to hold the branch load to be transported. The conveyor belt, running over or above the slide, acts continuously or periodically to move the mass of branches along the abovementioned slide from a loading point to discharging point.

The supporting structure and the slide are suitably designed so that the initial section is principally horizontal and located at a low level. This section is intended to be placed near a delimbing machine, from which the branches lopped off the trunks are dropped. Following this horizontal section, the conveyor angles upwards to a considerable height above the area onto which it discharges the branches.

The surface of the slide is preferably of steel plate or other suitable material, fabricated without openings, projecting parts or other hindrances into which the branches could catch or fasten during transport. The conveyor belt can be arranged to run above or otherwise in connection with the slide surface, and is guided, for example, by rotating sprocket wheels located at each end of the slide. If only one conveyor belt is used, it is placed so that it runs in the center of the slide. If two are used, they can be suitably located on either side of the slide's longitudinal centerline.

Further, according to the above-described invention for transport of branches by means of a branch conveyor, the conveyor belt should be loaded with a mass of branches sufficient in quantity to be both self-binding and effectively held by the engaging devices fastened to the belt.

A branch conveyor, according to this invention, is suitably designed to be transportable from one lopping station to another, along with the delimbing machine and other necessary equipment.

This invention is described in greater detail in the following, along with the attached drawings. FIG. 1 is an overall side view sketch of one form of this invention. FIG. 2 is a plan view of the conveyor belt of FIG. 1. FIG. 3 is a view of a section of the conveyor belt in larger scale than FIG. 1. FIG. 4 shows a section of the conveyor belt of FIG. 3.

The embodiment of the branch conveyor, according to the invention shown in FIGS. 1 and 2, comprises an extended steelwork supporting structure, 1, consisting for example of a number of longitudinally positioned steel tubes or other structural profiles with their connecting struts. Supporting structure 1 rests on the ground at one end, where it can be equipped with a hauling connection 25, while in the vicinity of its upper end it is borne up by the transport wheel assembly 3. Further, structure 1 supports slide 5 for the branches to be conveyed. The part of the slide which is fastened to the end section of structure 1 which rests on the ground, runs about horizontally. This horizontal slide section is intended to be placed under that point of a delimbing machine from which lopped branches fall down, and thus, is located as low as possible. Here, the slide's length and breadth are sufficient to catch all the fallen branches. The slide is preferably made of steel plate and lacks such holes, projecting parts or other unevennesses as might hinder the pushing of the branches along it.

Branches are pushed along slide 5 by a conveyor belt system which, in the design shown, consists of a conveyor belt 7 which runs over a sprocket 9 at the front end and over a sprocket 11 at the discharge end of the conveyor. The upper portion of the conveyor belt runs centrally over slide 5, while the lower portion of the conveyor belt is supported by suitable rollers 13. The conveyor belt is driven by an electric motor 23—either continually with relatively low speed, or intermittently at higher speed; this will be discussed more fully later. Conveyor belt 7 is built upon two chains—15 and 17—to which plates 21 are attached by suitable fasteners. Every plate section 21 is attached to a link of each of chains 15 and 17. Plate sections 21 are designed to overlap each other to some extent at their curved end sections. Thus, as the conveyor belt travels around sprocket wheels 9 and 11, it retains a more or less even surface which prevents branches and portions thereof from coming in between the plate sections, avoiding trouble with the operation of the conveyor.

The conveyor belt is equipped with engaging projections 19 to engage the branches to be conveyed. These projections can be fixed to points on the plate sections 21 and extend up to a considerable height over the slide 5—at least 3 cm., preferably at least 6 cm., for instance approximately 8 to 12 cm. Five such projections of similar size are attached to each plate that carries them, the projections being arranged in a straight line across the main centerline of the conveyor belt 7. In order to assure the desired engagement with the load of branches, the engaging projections can be bent forward in the direction of motion of the conveyor belt.

The clearance height of the discharge end of the branch conveyor should be at least 2 meters, preferably about 3 meters. Of course, this height can be chosen according to the conditions.

The breadth B of conveyor belt 7 (FIG. 2) can be considerably less than the breadth A of slide 5. The ratio B:A should be less than 2:3 preferably less than 1:2 and may, for instance, be between 1:2 and 1:3.

The length L of the portion of the conveyor belt set with engaging projections 19 corresponds to the approximate length, along the length of the conveyor, of a pile of branches collected under the delimbing machine. However, the length W may vary depending on the case. Projections 19 can be fixed along the whole length of the conveyor belt—particularly where the conveyor is continuously operated.

The general mode of branch conveyor operation ought to be apparent from the foregoing, but will be clarified in more detail, below.

When the conveyor is in use, its horizontal section is placed at the place at which the cut-away branches fall from the delimbing machine. The engaging projectons 19 are brought into the position shown on FIG. 1, whereafter the branches are collected on the horizontal section of conveyor 7, which is held stationary during this process. When a suitably thick layer of branches has been accumulated, having a depth of at least 30 cm. preferably at least 50 cm., for instance 50–100 cm., conveyor chain 7 is started up, and the pile of branches, sliding on slide 5, is transported up to the conveyor's highest point, after which the load falls down on the ground. Allowing the layer of branches to build up to a considerable height before the conveyor is started insures that the projections 19 properly engage the pile of branches and that the branches themselves interlock effectively. Because the slide is (preferably) one smooth, unbroken surface, the pile of branches sweeps along the needles, bark and other small portions separated during transport, thus always keeping slide 5 clear of material. Further, this feature prevents the accumulation of needles and other small particles around the delimbing machine, where they might cause difficulty in long-term operation.

If engaging projections have been attached to conveyor belt 7, to the extent of length L, at two sections and if the distance between the two groups of projections as measured along both parts of the conveyor chain are equal, the forward feeding of a pile of branches to the discharging point at the conveyor's high end brings the second group of projections 19 into position at the branch-collecting point under the delimbing machine. Also in this case the mode of operation may be intermittent. The man controlling the delimbing machine may be given the additional task of deciding when to start up the branch conveyor. The branch conveyor can be halted in desired position either manually or automatically, after it has moved its intended distance.

The conveyor belt can also be driven continuously. In this case, the conveyor can be equipped with engaging projections along its whole length, with the belt moving at such a low speed that a suitably thick layer of branches, as noted above, is continually assembled on the conveyor's lowest, horizontal section. With this mode as well, good engagement of the branch load by the engaging projections and good mutual interlocking between the branches is assured.

The invention is not limited to the embodiment shown and described, as it can be realized in other ways. It is thus not necessary for the slide 5 to consist of continuous plating, since the conveyor belt 7 itself can act as a relatively unbroken supporting medium for the conveyed branches. Thus, the single plate 5 possibly can be replaced with two suitable plates, one on either side of the conveyor belt 7, to act as sliding surfaces for those portions of the pile of branches which extend out from the edges of the conveyor chain.

The conveyor belt can be constructed in other ways than shown in the drawings, and possibly can be replaced with a conveyor band having suitable engaging projections and running on suitable guide and driving wheels. Further, the conveyor can be constructed to provide forward movement of the belt along slide 5 when conveying branches and a return movement back along the same pathway to the branch loading point. In this case, the engaging projections 19 can be designed to swing downward under backward pressure when the projections are moved in under the newly-collected load of branches waiting at the collecting point of the conveyor. In certain cases, the supporting structure can be replaced by supporting structures spaced at a distance from each other, between which can be fitted the slide surface and conveyor belt according to the invention.

What is claimed is:

1. A tree branch conveyor comprising a frame, an elongated slide fitted to said frame, said slide including a substantially smooth and unbroken plate having a substantially horizontal section at one end defining a branch loading area near the ground plane and an upward-angled section extending a considerable height above the ground plane, an elongated, flexible, endless conveyor member running along and close above both sections of said slide, said conveyor member consisting of sections fixed in a transverse direction on at least one driving chain, said sections being independent of each other and at least some of said sections having thereon a large number of branch engaging devices in the form of upwardly pointing projections for holding a load of branches during transport, said devices being substantially evenly distributed over at least one area the length (L) of which is limited to a fraction of the total length of said slide and the breadth (B) of which is considerably less than the total breadth (A) of said slide with the ratio between said breadths $(B:A)$ being less than 2:3, the main portion of the conveyor belt behind and in front of said area being free from branch engaging projections, and means for intermittently driving said conveyor member whereby branches to be conveyed will be amassed at the loading area with said conveyor member at rest and conveyed to the other end of the conveyor to discharge said branches when said conveyor member is driven.

References Cited

UNITED STATES PATENTS

| | | |
|---|---|---|
| 161,903 | 4/1875 | Rodgers. |
| 304,437 | 9/1884 | McClain et al. |
| 561,582 | 6/1896 | Guiler. |
| 1,845,066 | 2/1932 | Walter. |
| 3,120,887 | 2/1964 | Holcer. |
| 3,262,549 | 7/1966 | Stewart et al. |

EDWARD A. SROKA, *Primary Examiner.*

M. L. AJEMAN, *Assistant Examiner.*

U.S. Cl. X.R.

198—221